United States Patent [19]

Cuvelier et al.

[11] Patent Number: 4,638,448

[45] Date of Patent: Jan. 20, 1987

[54] ELECTRONIC ODOMETER IN PARTICULAR FOR A CYCLE

[75] Inventors: Antoine L. Cuvelier; Guy M. G. Boucher, both of Paris, France

[73] Assignee: Huret et ses Fils, Nanterre, France

[21] Appl. No.: 531,754

[22] Filed: Sep. 12, 1983

[30] Foreign Application Priority Data

Sep. 15, 1982 [FR] France ................................ 82 15593

[51] Int. Cl.⁴ ...................... G06M 3/06; G01C 22/00; B62J 39/00; G06F 15/02
[52] U.S. Cl. .................................... 364/565; 73/490; 364/561; 364/705; 364/708; 377/49
[58] Field of Search ............... 364/561, 424, 705, 565; 361/390–396; 73/273, 738, 490, 493, 510; 377/24, 49; 235/95 B; 434/61; 272/DIG. 5; 116/62

[56] References Cited

U.S. PATENT DOCUMENTS

| | | | |
|---|---|---|---|
| 4,009,339 | 2/1977 | Anderson et al. | 364/561 X |
| 4,071,892 | 1/1978 | Genzling | 364/561 X |
| 4,156,190 | 5/1979 | Chittenden et al. | 324/175 |
| 4,168,870 | 9/1979 | Hill | 361/390 |
| 4,220,996 | 9/1980 | Searcy | 364/561 |
| 4,362,392 | 12/1982 | Kumata | 364/705 |
| 4,373,116 | 2/1983 | Shimizu et al. | 364/424 |
| 4,443,008 | 4/1984 | Shimano | 434/61 X |
| 4,450,743 | 5/1984 | Tanimoto | 364/705 X |
| 4,472,775 | 9/1984 | Mizuno et al. | 364/565 X |

FOREIGN PATENT DOCUMENTS 2308910  11/1976  France ................................ 364/424

Primary Examiner—Felix D. Gruber
Attorney, Agent, or Firm—Trexler, Bushnell & Wolters, Ltd.

[57] ABSTRACT

The odometer in particular for a cycle comprises a case 1 containing a micro-processor connected to a movement sensor associated with a wheel of the cycle, a display for the items of information and at least one control key relating to the display of the items of information processed by the micro-processor. The control key is constituted by at least one part of the upper side of the cover 3 of the case 1, which cover is pivotally mounted on the bottom 2 of the case and it includes devices for emitting sound signals respectively corresponding to the nature of the magnitudes appearing in the display devices and seen through a window 12 of the case.

13 Claims, 7 Drawing Figures

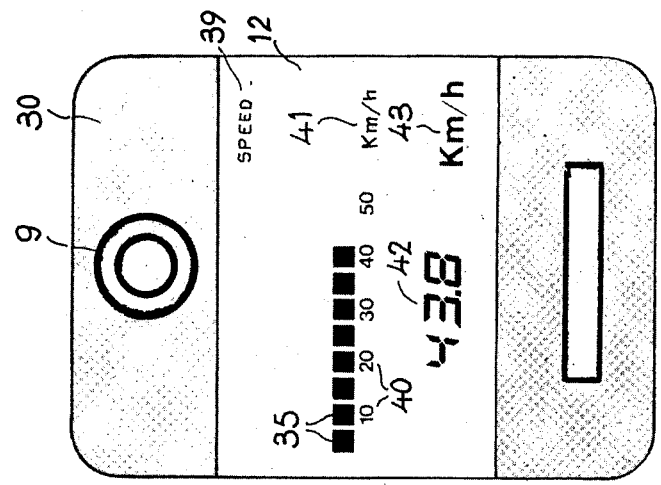
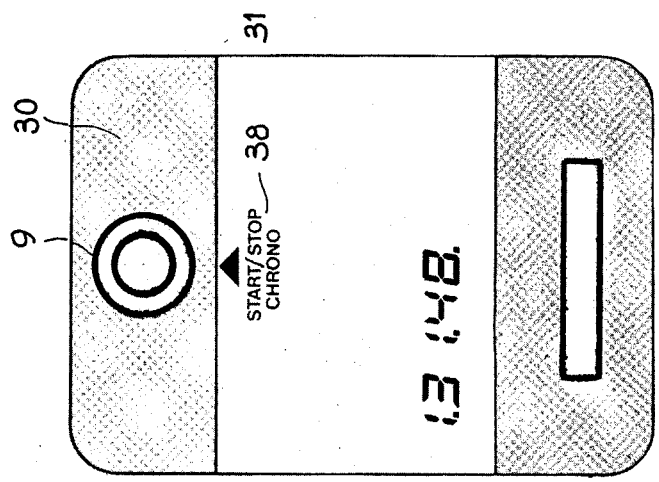
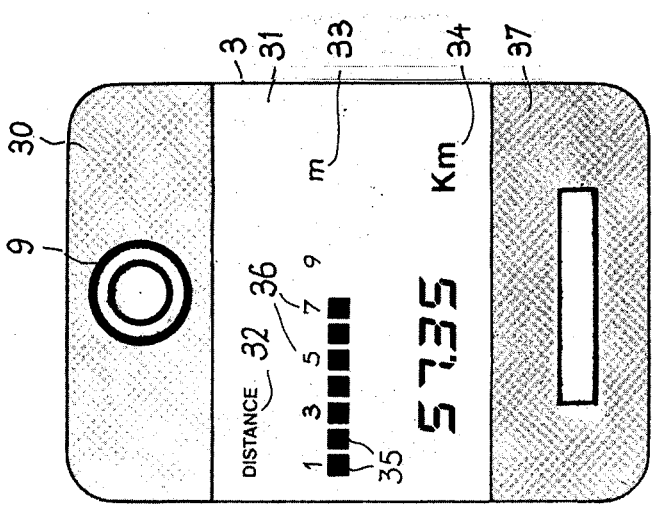

ELECTRONIC ODOMETER IN PARTICULAR FOR A CYCLE

The present invention relates to odometers or distance recorders in particular for cycles and more particularly relates to an electronic odometer adapted to give to the user a number of indications of the distance travelled through, the speed and other indications upon the simple actuation of control keys.

Electronic odometers are known which comprise a micro-processor receiving information, for example from a magnetic sensor associated with magnets fixed to the front wheel of the cycle, digital display means displaying items of information processed by the micro-processor which is suitably programmed for this purpose, and one or more control keys placed on the front side of the odometer.

Known odometers of the aforementioned type have a number of drawbacks.

Their handling requires on the part of the user a sustained attention in particular due to the fact that the control key or keys are not easy to handle on account of their small size.

The searching of the control keys and the recognition of the information displayed requires that the user diverge his attention from the road during an appreciable amount of time and this constitutes serious risk of accidents.

The presentation of the items of information is usually not clear so that the user has difficulty in determining the nature of the magnitude displayed in response to a demand on his part.

An object of the invention is to overcome the aforementioned drawbacks and to provide an electronic odometer which permits a rapid and easy access to the information it contains, while avoiding the uncertainties as concerns the magnitudes displayed.

The invention therefore provides an electronic odometer in particular for a cycle, comprising a case containing a micro-processor connected to a sensor of movements associated with a wheel of the cycle, means for displaying the information and at least one control key for the display of the items of information processed by the micro-processor, said control key being constituted by at least one part of the upper side of the case and the odometer comprising means for transmitting sound signals corresponding respectively to the nature of the magnitudes appearing on the display means under the action of the control key.

Further features of the invention will be apparent from the following description which is given solely by way of example with reference to the accompanying drawings, in which:

FIG. 4 is a plan view of the upper side of the odometer according to the invention on which an information of the distance travelled through is displayed;

FIG. 5 is a view similar to FIG. 4 in which time information is displayed;

FIG. 6 is a view similar to FIGS. 4 and 5 in which an information of the speed is displayed.

Figure 1:
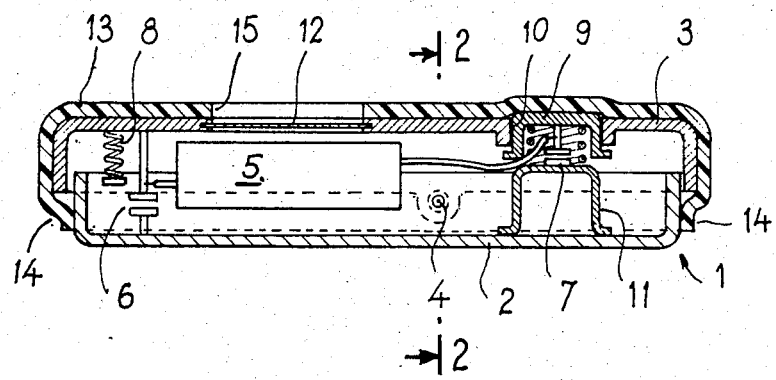
FIG. 1 is a view partly in elevation and partly in section of an odometer according to the invention.
Figure 2:
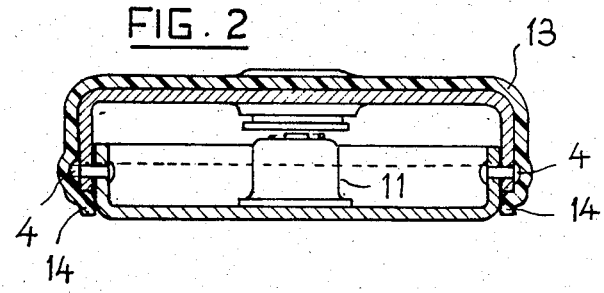
FIG. 2 is a sectional view taken on line 2—2 of FIG. 1.

The odometer or distance recorder shown in FIGS. 1 and 2 comprises a case 1 formed by a bottom 2 and a cover 3 which caps the bottom 2 and is articulated to the latter by means of pins 4. The case thus formed contains an electronic circuit for counting and processing the information shown in more detail in FIG. 3 and generally designated by the reference numeral 5.

Also mounted in the case 1 are a first switch 6 adapted to control the main functions of the odometer and a second switch 7 adapted to control the secondary functions which will be explained hereinafter.

Interposed between the bottom 2 and the cover 3 are return springs 8 for returning the cover to an upper position, the switch 6 is directly controlled by exerting a pressure on the cover 3. On the other hand, the switch 7 controlling the secondary functions of the odometer is controlled by a push-button 9 which is independent and extends through an aperture 10 formed in the cover. The switch 7 is advantageously disposed on a base 11 placed in the bottom of the case. The cover 3 is moreover provided with a transparent window 12 adapted to permit the reading of items of information appearing on the display means which are part of a circuit shown in FIG. 3.

The whole of the cover 3 is covered with a sheath 13 of flexible material the edge 14 of which constitutes a sealing element in the region of the junction between the bottom 2 and the cover 3 of the case. As can be seen in particular in FIG. 2, the edge portion 14 of the sheath 13 also ensures the sealing of the assembly in the region of the articulation pins 4 connecting the cover to the bottom. If the sheath is made from an opaque material, it has an opening 15 revealing the window 12 displaying the items of the information delivered by the odometer.

When this odometer is employed on a bicycle, it may be mounted on a suitable support (not shown) fixed to the handlebar in the vicinity of the stem of the latter.

Figure 3:
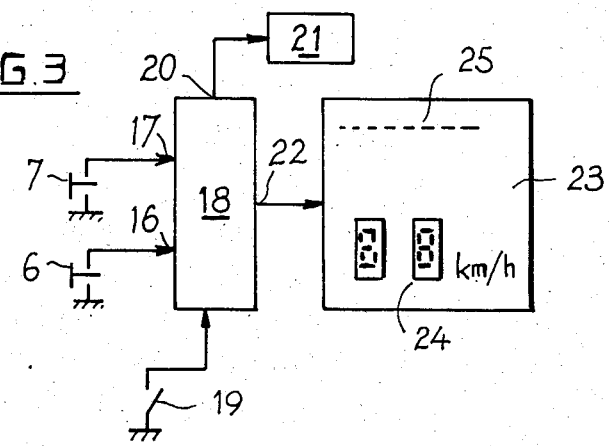
FIG. 3 is a block diagram of the electronic circuit contained in the case of the odometer shown in FIG. 1.

In the circuit represented in FIG. 3, there are shown the first and second switches 6 and 7 respectively controlled by the cover 3 of the odometer and by the push-button 9 which extends through the cover. These switches are respectively connected between earth and control terminals 16 and 17 of a micro-processor 18. The micro-processor 18 is connected to a sensor of movements 19 constituted by for example a magnetic sensor associated with a wheel of a bicycle. The micro-processor comprises first output 20 connected to a generator 21 of sound signals, and a second output 22 connected to a display device 23 which includes, in the presently described embodiment, digital display means 24 and analog display means 25.

Figure 3A:
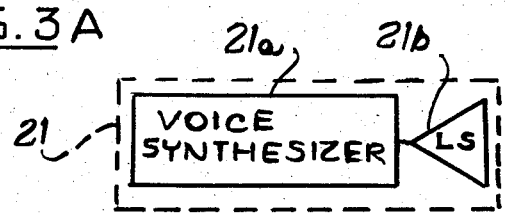
FIG. 3A is a block diagram illustrating a modification of a portion of FIG. 3.

As shown in FIG. 3A, the sound generator 21 may comprise a voice synthesizer 21a and a loud speaker 21b.

The digital display means are formed by figures formed by seven segments. This display device is of the type employing nematic liquid crystals, whereas the analog display means are constituted by segments which are read by reflection of the light and disposed in alignment and constituting a dark bar the length of which varies with the measured magnitude.

According to a modification, it is possible to envisage the association with the digital display means such as those shown in FIG. 3, analog display means constituted by a needle or by radial divergent lines formed by segments the successive illumination of which simulates the movement of a needle over a dial.

FIGS. 4, 5 and 6 show the front side of the odometer according to the invention. This front side is the top of the cover 3 and has a generally rectangular shape, the large sides of the rectangle being vertical. The top of the cover 3 is divided into three juxtaposed areas. The first area 30 contains the control button 9 of the secondary functions. A second area 31 is occupied by the display window of the odometer. The display device 23 (FIG. 3) is so constructed that, when the micro-processor 18 is actuated for producing the display of a given magnitude, indications specific to the nature of this magnitude and graduations in units of measure of this magnitude are solely visible. Thus, it can be seen in FIG. 4 that upon the display of a distance, it is the indication of distance 32 and the graduations in meters 33 and the units in kilometers 34 which solely appear in the three display lines of the odometer. In the considered example, the indication "distance" 32 appears at the left in the first line of the display window, the indication "m" appears at the right of the second line in alignment with the variable-length line formed by luminous squares 35 which define an analog measurement of the distance in meters in the form of a luminous line of variable length.

Appearing above the luminous squares 35 are graduations 36 which give a scale in meters. In the third line of the display window appear digital items of information of the distance travelled through and the units 34 of measurement of this distance. The analog measurement in meters completes the digital measurement.

The top of the cover has a third area 37 which in particular bears the trade mark of the constructor.

FIG. 5 shows the top of the cover 3 in the display window on which appear the items of information relating to the timing by means of a chronometer of the time which elapses from for example the start of a tour on a bicycle. This FIG. 5 shows that all items of information of distance have disappeared and that only items of information relating to the time are displayed.

In the first line there appears an indication 38 for starting or stopping the timing by means of a chronometer with the use of the button 9.

In the second line occupied by the squares forming the luminous line, no information appears in this mode.

In the third line there appears a digital indication of the time elapsed since the preceding resetting to zero of the system.

FIG. 6 is a view corresponding to FIGS. 4 and 5 in which it can be seen that only the items of information relating to the instantaneous speed of the vehicle on which the odometer is mounted appear in the display windown 12 to the exclusion of any other indication.

In the first line, there appears the word "speed" 39 placed on the right.

In the second line, there appears a graduation 40 in tens of km/h and, above these graduations, there is an illumination of the luminous squares 35 forming the luminous line giving the analog indication of the speed. At the right of the second line, there appear the units 41 of measurement of the speed.

In the third line, there appears the digital indication 42 with the units 43 of measurement of the speed.

When, in the course of a travel, the user desires to be informed about the distance he has travelled through since the moment when he started his odometer, he depresses a single time the cover 3 and thus produces the closure of the switch 6 and the operation of a first main function of the odometer, namely the measurement of the distance. The programming of the microprocessor 18 is so arranged that, when the latter receives a first signal from the switch 6, it immediately produces the emission by the sound signal generator 21 of a "bip" signal which is a characteristic signal of the display of the distance, so that the user knows in advance the nature of the magnitude he will read. When he looks at the display window of the odometer, only indications of distance represented in FIG. 4 are visible so that there is no ambiguity in the reading of these indications.

When the user desires to know the time which has elapsed since his departure, he actuates again the odometer by depressing the cover 3 of the latter. This new action produces the emission by the sound signal generating device of a new "bip-bip" signal associated with the notion of time. The user consequently knows that the indications which will appear in the display window following on this sound signal will be the indications of time. Then, in order to obtain indications of instantaneous speed, the user will depress a third time the cover 3 of the case of the odometer and this will produce the emission of a "bip-bip-bip" signal associated with this notion of speed. The indications of speed appearing in the display window in the manner shown in FIG. 6 may be read without any ambiguity by the user since the latter expects to find these indications.

Thus it can be seen that the three main functions of the odometer just described are associated with specific signals which characterise them and which are very easy to remember on the part of the user so that for the searching of the information he desires, he has merely to depress the cover of the odometer and listen in succession to the signals emitted until the obtainment of the signal corresponding to the information he desires to obtain.

The arrangement is such that, when the three indications of distance, time and speed have been examined, the system is ready to respond to a new cycle of interrogations.

The control button 9 concerning function may be employed more rarely since it commands for example the display of a total distance travelled through, the starting and stopping of a timing operation by means of a chronometer with the corresponding display, the display of an average speed, the display of the time of the day, devices of distance, speed and time or other devices. However, the control button 9 commanding these various secondary functions is disposed in such manner as to be visible and consequently easily accessible. As concerns the various functions of the odometer, they are effected by suitable programming of the microprocessor 18.

In the embodiment just described, there has been provided to the user three main functions associated with three sound signals which characterise them and with three characteristic displays of these functions. The auxiliary functions are not associated with characteristic sound signals. Indeed, in order that such a means be practical, it is preferable to arrange that the number of sound signals to be remembered by the user be relatively small. However, it will be understood that it is possible to envisage an odometer which would have a larger number of associations of functions and sound signals which characterise them.

The main function switch 6 is actuated by the depression of the cover 3 of the case of the odometer which is pivotally mounted on the bottom 2 of this case. However, it will be understood that other means may be employed for actuating the switch 6. For example, the use of capacitive sensor keys may be envisaged which are disposed in the upper side of the case and which may be actuated by a simple approach of the hand or by contact, in which case the case of the odometer would have no moving part.

It is also possible to envisage the use of infra-red ray keys the actuation of which is ensured by the simple proximity of the hand of the user.

The sound signal generator may also be constituted by a voice synthetizer connected to the micro-processor and which, instead of the brief and single sounds characterising the magnitude displayed, synthetizes the human voice. A loudspeaker is then provided for broadcasting the sound of the synthetizer.

The synthetizer may pronounce the words "distance", "time", "speed" or "kilometers", "hour", "kilometers per hour".

The electronic odometer just described has, with respect to known odometers, the essential advantage of being extremely simple to handle and of displaying items of information with no ambiguity.

Further, it may be actuated by the user without the latter being required to look at it at the moment it is actuated, the displayed items of information being announced by a sound signal which characterises them.

The odometer just described has been considered as applied to a bicycle, but it will be understood that it may be used for giving indications of distance travelled through, time, speed and other indications for any type of vehicle.

Having now described our invention what we claim as new and desire to secure by Letters Patent is:

1. An electronic odometer in particular for a cycle, comprising a case having a bottom and a cover pivotally mounted on said bottom, a micro-processor in the case, a sensor of movements for associating with a wheel of the cycle and connected to the micro-processor, display means connected to said micro-processor for displaying items of information, such as distance, speed of time information, a signal generator connected to said micro-processor and adapted for identifying under the control of said micro-processor the nature of said items of information displayed on said display means, and at least a first control key relating to the display of items of information processed in the micro-processor, said first control key being constituted by said cover of the case, said signal generator emitting signals respectively corresponding to the nature of the items of information displayed on said display means, a switch adapted to control through said micro-processor main functions of the odometer, said switch being associated with said first control key and connected to the micro-processor, the actuation of said switch resulting in the display of items of information processed by said micro-processor and the emission by the signal generator of signals characterizing the displayed items of information.

2. An odometer according to claim 1, wherein said first control key constituted by a capcitive sensor disposed in the cover of the case.

3. An odometer according to claim 1, wherein said signal generator is a sound signal generator.

4. An odometer according to claim 3, wherein the sound signals emitted by said generator are brief sounds the number of which sounds respectively characterises the items of information displayed when the micro-processor carries out main functions.

5. An odometer according to claim 4, wherein said main functions are three in number, the first main function being the distance which is identified by a brief sound, the second main function being the time identified by two brief sounds and the third main function being the instantaneous speed identified by three brief sounds.

6. An odometer according to claim 3, wherein the sound signal generator is an electronic synthetizer of the voice connected to the micro-processor and associated with a loudspeaker and adapted to synthesize words designating the nature and/or the units of the displayed items of information.

7. An odometer according to claim 1, further comprising a second control key relating to secondary functions associated with a second switch relating to secondary functions connected to the micro-processor.

8. An odometer according to claim 7, wherein the case comprises a bottom and a cover and said first control key is constituted by the cover of the case which cover is pivotally mounted on said bottom and said control key of the secondary functions extends through a wall of the cover by way of an orifice in said wall.

9. An odometer according to claim 7, wherein the display of a given magnitude brought about selectively by said first control key and said second control key, erases any indication relating to a previously displayed item of information from the display means.

10. An odometer according to claim 7, wherein said secondary functions are in particular, the timing by means of a chronometer, the average speed, the total distance travelled through, the hour of the day, the objects of distance, speed and time.

11. An odometer according to claim 1, wherein the case has an upper side which defines a window allowing the observation of items of information relating to the display means.

12. An odometer according to claim 11, wherein the window is formed in a cover which is part of said case.

13. An odometer according to claim 1, further comprising a sheath covering the cover, the sheath having an edge portion which constitutes a sealing element in the region of a junction between the bottom and the cover of the case.

* * * * *